United States Patent [19]

Wise

[11] 4,159,300

[45] Jun. 26, 1979

[54] METHOD FOR MANUFACTURING CONNECTORS IN STRIP FORM

[75] Inventor: Joseph A. Wise, Mechanicsburg, Pa.

[73] Assignee: AMP Incorporated, Harrisburg, Pa.

[21] Appl. No.: 819,915

[22] Filed: Jul. 28, 1977

Related U.S. Application Data

[62] Division of Ser. No. 628,617, Nov. 4, 1975, Pat. No. 4,080,148.

[51] Int. Cl.$^2$ .............................................. B29B 3/00
[52] U.S. Cl. .................................. 264/278; 264/167; 264/275
[58] Field of Search ............... 264/167, 166, 251, 216, 264/328, 334, 278, 275, 247; 425/814, 576, 112, 129, 122, 60, 249, 246

[56] References Cited

U.S. PATENT DOCUMENTS

| | | | |
|---|---|---|---|
| 3,196,490 | 7/1965 | Erb | 264/167 |
| 3,507,010 | 4/1970 | Doleman et al. | 264/167 |
| 3,758,657 | 9/1973 | Menzin et al. | 264/167 |

Primary Examiner—Jay H. Woo

[57] ABSTRACT

A rotatable wheel has cavities formed in the perimeter thereof. Movable coring pins are also mounted on the wheel perimeter and have cam track follower means which ride in stationary cam tracks positioned adjacent the wheel and which move the coring pins in and out of said cavities as said wheel rotates. An extruding means has a nozzle positioned adjacent the wheel perimeter and forces molten plastic into the cavities as they pass thereby with the coring pins inserted therein. The configuration of, and spacing between, the wheel perimeter and the nozzle produces plastic links between the plastic products formed in the cavities to provide a continuous strip of such parts secured to a common carrier, which strip can be wound upon a take-up reel directly from the wheel. Alternatively, movable coring pins positioned radially with respect to said wheel, or at other angles, can be moved in and out of the cavities as the wheel rotates. In other embodiments, rotatable coring pins having threads on one end and gear means on the other can be actuated by stationary gear rack means at predetermined angular positions of the wheel to produce threaded wire nuts and the like.

4 Claims, 27 Drawing Figures

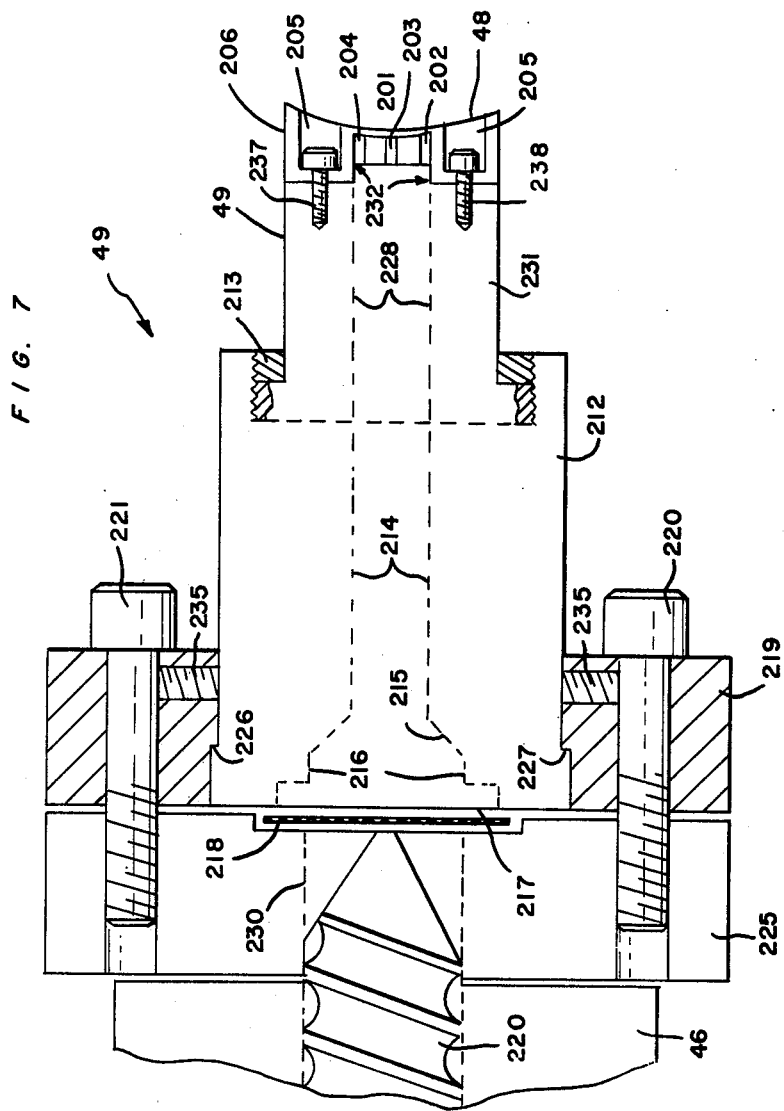

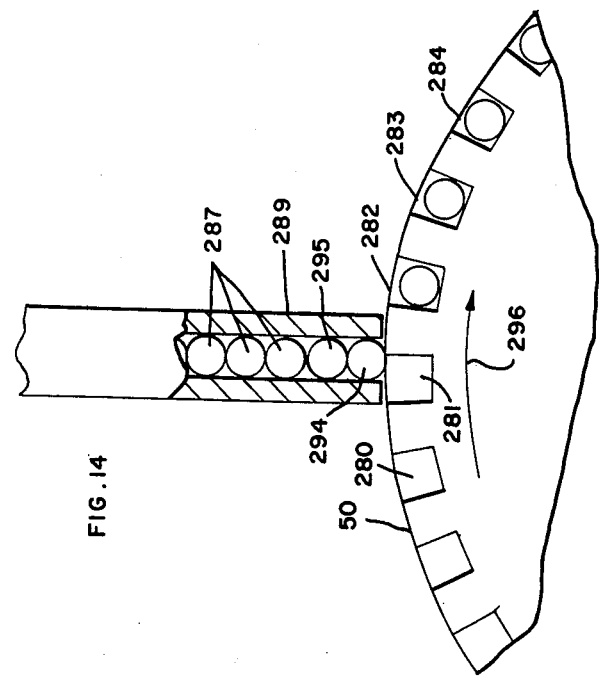
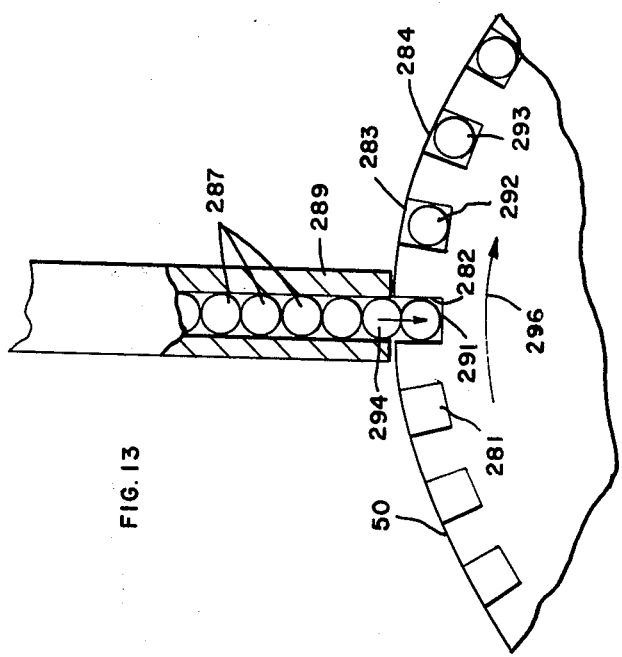

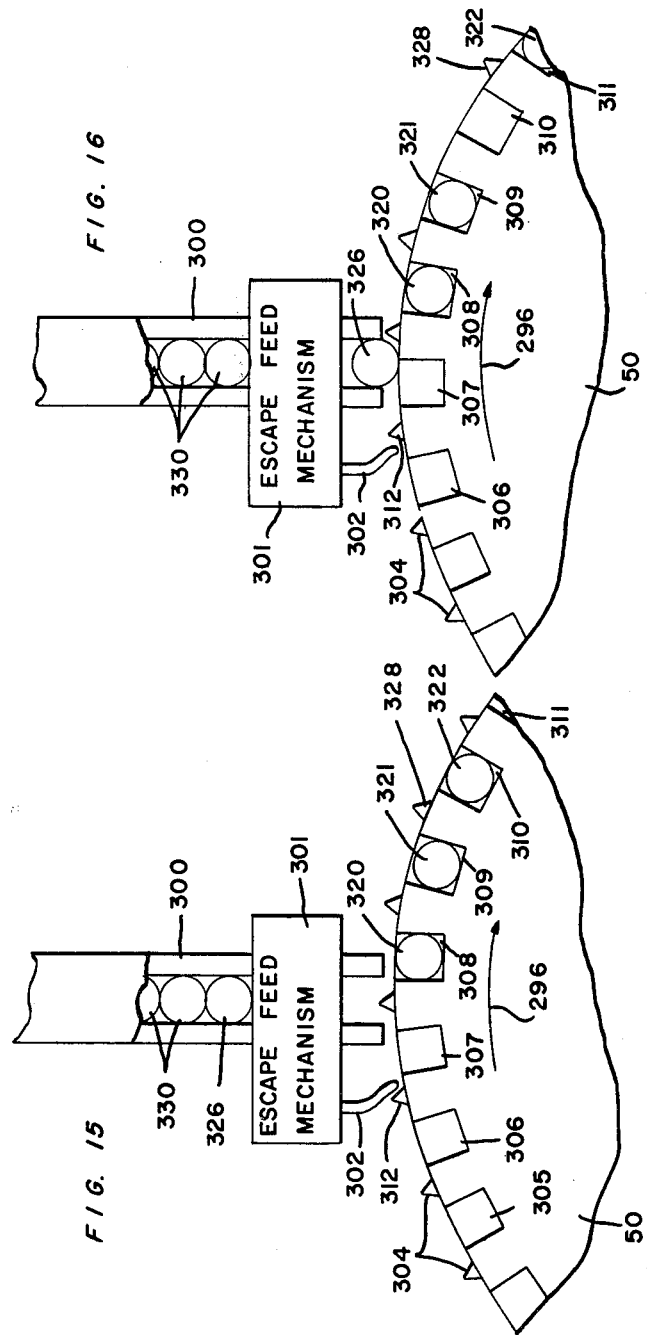

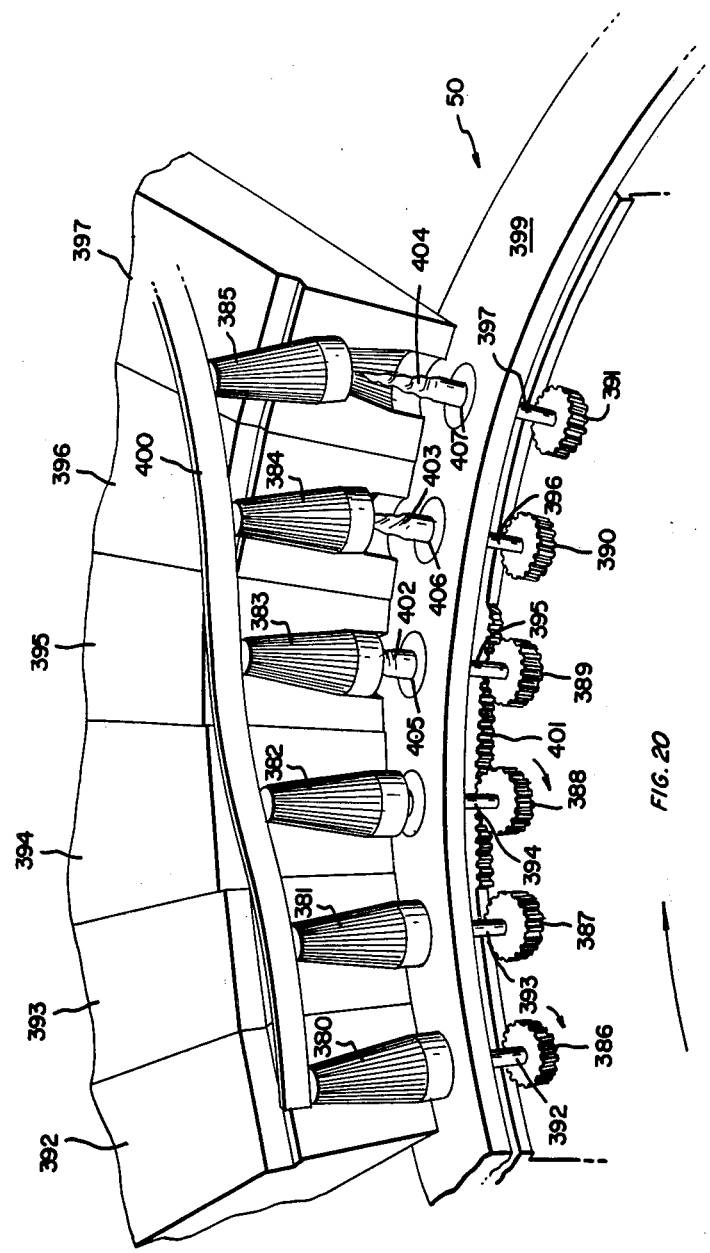

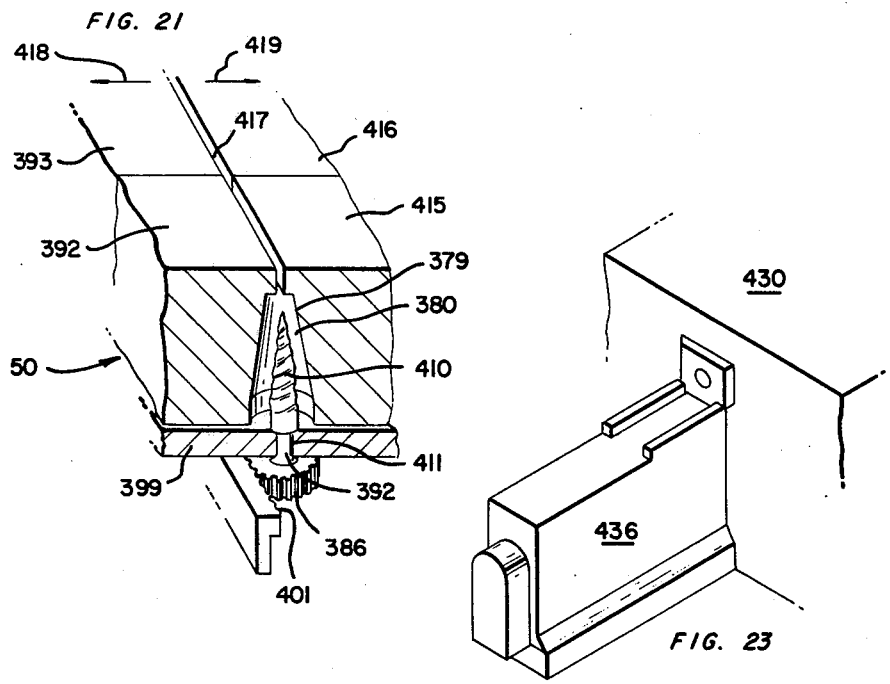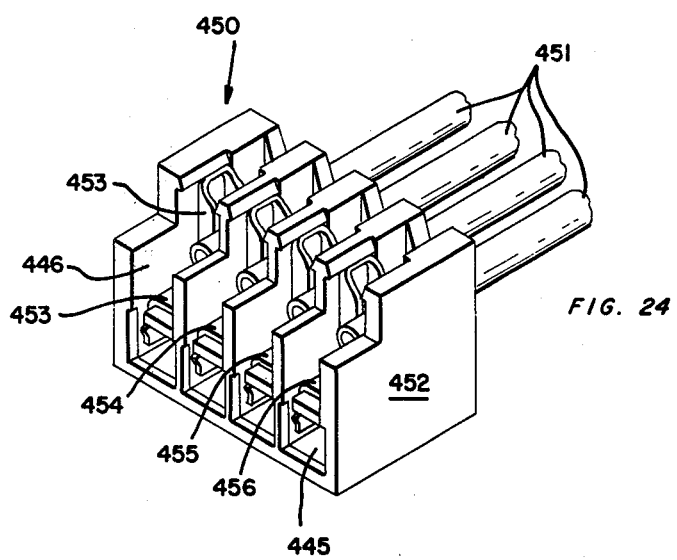

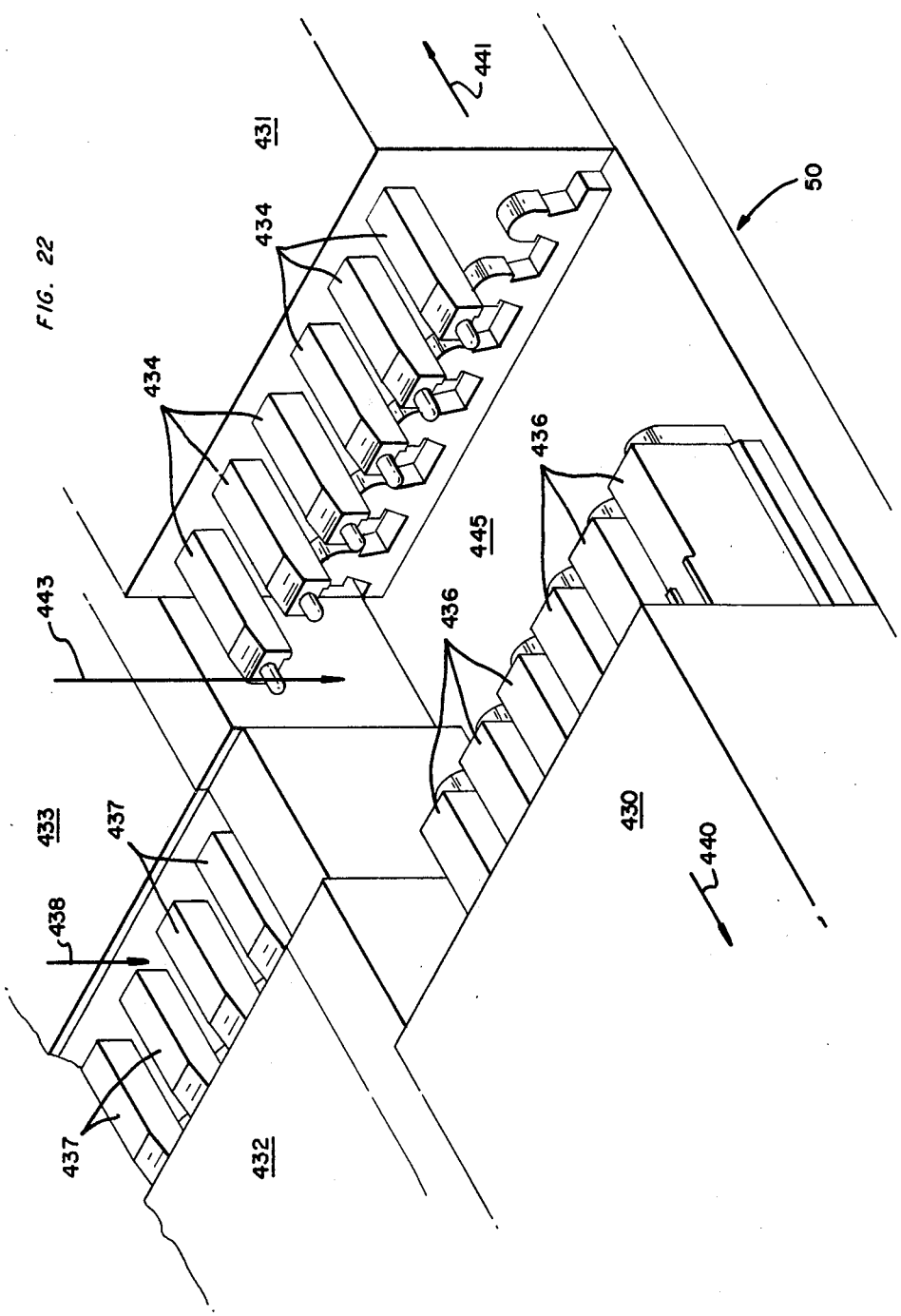

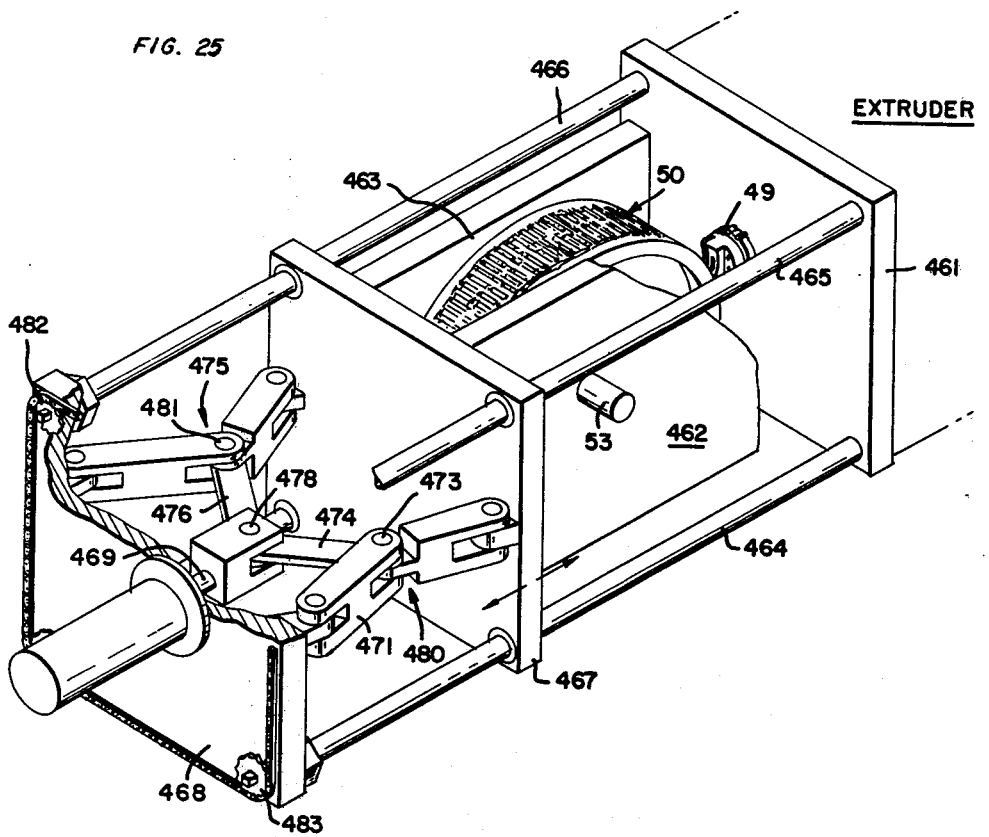

METHOD FOR MANUFACTURING CONNECTORS IN STRIP FORM

This is a division of Ser. No. 628,617, filed Nov. 4, 1975 now Pat. No. 4,080,148.

BACKGROUND OF THE INVENTION

This invention relates generally to an apparatus and a method for manufacturing plastic and plastic articles and more particularly to a method and apparatus employing a continuously rotating wheel or turret having molding cavities formed on the periphery thereof with cores entering said cavities from various side angles and also radially from within the wheel to produce a continuous web or chain of plastic products connected together by connecting plastic links.

The various means for manufacturing a plastic product by molding can be divided into three main catagories. The first catagory is the use of a plurality of cavities which are placed together in a frame. Plastic is then injected into the cavities from one or more angles in the presence of cores which also can be inserted into the cavities from one or more directions. The plastic is then permitted to cool, the cores withdrawn and the mold disassembled so that the plastic products can be removed. The second means for manufacturing plastic products is to provide a chain or track having thereon a plurality of cores and cavities making up a plurality of molds. The track or chain is moved a predetermined distance to place a certain number of the molds under a plastic extruding source. The core or pins are then inserted into each of the cavities and the plastic is subsequently extruded into said plurality of cavities and the cores removed after cooling. The track or chain is then moved a discrete distance to place another plurality of molds and cavities underneath the plastic extruding source and the process is repeated. By this second approach the resulting plastic product can be formed either separately, in that they are each individual or separated from the other, or they can be linked together on a common carrier or by connecting links between adjacent products.

The third catagory comprises a wheel or turret upon the perimeter of which there are formed a plurality of cavities. A plastic extruding source is placed adjacent the perimeter of the wheel, and as the wheel is rotated past the extruding source or head, plastic is forced into the cavities. The wheel continues to rotate while cooling is effected. The finished product is then removed from the perimeter of the wheel before that portion of the perimeter rotates around and under the extruding head again for the next injection of plastic. Each of the formed plastic products can be connected together on a common carrier strip or by interconnecting links between adjacent products. A variation of the rotating wheel or turret is to cause a wheel to rotate to a given angular distance and then stop. While in a stopped condition plastic is inserted into a given number of the cavities underneath the extrusion head or source. The wheel is then caused to rotate another given angular distance to place a new set of empty cavities under the extruding source or head which are then in turn filled with plastic. The finished product is then removed from the wheel in a continuous strip connected by a common carrier or interconnecting links as mentioned above.

In all known prior art involving a rotating wheel or turret the plastic is forced directly into the cavities as the perimeter of the wheel passes under the extruding head. The plastic product takes the shape of the cavities which have been formed in the perimeter of the wheel or turret. The complexity of the plastic product which can be formed in this manner is limited.

BRIEF STATEMENT OF THE INVENTION

A primary object of the invention is to provide means utilizing a continuously rotating wheel or turret for producing a continuous web or chain of plastic products and in which a wide variety of side pin action can be employed.

A second purpose of the invention is an injection molding apparatus in which the mold cavities are formed in the perimeter of a continuously rotating wheel or turret, and employing side action core pins which move into and out of the mold cavities as the wheel rotates to produce complex molded plastic products.

A third purpose of the invention is a rotating wheel having a plurality of mold cavities formed on the perimeter thereof and further incorporating side pin action as the turret rotates to produce a continuous web or chain of plastic products with adjacent products being joined together by a plastic connecting strip or a plastic carrier, and in which said side pin action can be at virtually any angle with respect to a plane normal to the axis of rotation of the rotating wheel.

Another object of the invention is to provide a rotating wheel having a plurality of cavity molds on the perimeter thereof supplied with plastic from an extruder positioned adjacent said perimeter and having movable core pins which are configured to grip and position metal contact parts, such as ferrules and other non-plastic elements, within the cavity and which are then encapsulated in plastic as said cavities pass by a plastic extruder head.

A further purpose of the invention is a rotating wheel having a plurality of mold cavities formed in the perimeter thereof and supplied with fluid plastic from an extruding head positioned adjacent said perimeter, and further having movable core pin action for positioning metal terminals within said cavities immediately prior to the flow of plastic into said cavity and for shaping the plastic element to thereby produce a chain of plastic coated, insulated terminals joined together by interconnecting plastic links, which chain is then removed from the rotating turret in a cooled and solid state and wound upon a reel for subsequent use in appropriate applications such as electrical circuits.

A sixth object of the invention is a rotating wheel with a plurality of mold cavities formed in the perimeter thereof, means for extruding plastic into the cavities and moveable core pin means which is oriented radially with respect to said wheel and is responsive to suitable activating means to enter said cavities prior to the introduction of plastic into the cavity and then is withdrawn from said cavity after the molten plastic has solidified.

In accordance with still another object of the invention there is provided a rotatable wheel with cavities in the perimeter thereof and with core pin means having a first end which is threaded and which extends into predetermined ones of said cavities and having the other end thereof comprise a gear-like means which is constructed to engage a stationary gear rack mounted on the same frame as the wheel to cause said core pin means to rotate in an angular direction so as to unscrew themselves from within the threaded plastic receptacle which they have formed and thereby push the plastic receptacle away from the perimeter of the wheel so that it can be wound on a take-up reel.

An eighth object of the invention is an improved method and apparatus for making plastic products by injection molding techniques, generally.

In accordance with one form of the invention there is provided a rotatable wheel mounted on a frame and having a plurality of mold cavities formed in the periphery thereof, and a means adjacent said perimeter constructed to extrude plastic into said cavities as the cavities pass the said extruding means. Each of said cavities has one or more movable core pins which are responsive to suitable activating means to enter into said cavities, ordinarily immediately prior to the introduction of the heated, molten plastic into said cavity, and which are then withdrawn from said cavity after said molten plastic has solidified, with the configuration of at least a portion of the molded product being determined by the configuration of the core pins.

The means for moving the core pins into and out of the cavities in one form of the invention, comprises a pair of cam tracks formed on the circumferential perimeter of stationary rings or discs which are concentric with said wheel and which can lie on either side of said wheel. The core pins have cam following elements or pawls which ride in the tracks or grooves formed in said stationary rings. The said grooves in said stationary rings do not lie in a single plane but rather follow a path on the perimeter of the stationary rings whereby the core pins are moved inwardly towards the side of the wheel and into the cavity before the plastic is extruded therein and then, after a predetermined degree of further angular rotation of the wheel, and after the plastic has cooled, are moved out of the cavity, thereby freeing the newly formed plastic product so that it can be removed from its cavity in the rotating wheel.

It is to be noted that the circumferential surface of the wheel and the configuration of the extruding head are such that a web or connecting link can be formed, and usually is formed, between adjacent plastic products, thereby creating a continuous web or chain of the plastic products which can be taken from the wheel in strip form and subsequently stored by suitable means, such as a take-up reel.

In accordance with one feature of the invention, the direction of the afore-mentioned core pin action, which can be defined as a side action pin action, can be almost any angle with respect to a plane normal to the axis of rotation of the wheel. Furthermore, there can be more than one core pin action on both sides of a cavity and entering the cavity at different angles.

In accordance with another feature of the invention conductive metal terminals or portions thereof can be inserted into the cavities while the side pins are withdrawn therefrom, and then gripped and positioned within the cavity by means of the side pins as said side pins move into the cavity, with the alignment of such metal terminals being determined by the side pins. Subsequently, the metal terminals are encapsulated externally and, if desired, also internally, by the molten plastic flowed into the cavity.

In accordance with still another feature of the invention metal terminals or contacts can be secured to either a plastic strip or a metal strip, which strip is then caused to pass between the circumferential perimeter of the wheel and the extruding head. The configuration of the perimeter of the rotating wheel and the extruding head is such that the metal terminals are coated with plastic on selected surfaces thereof in a continuous strip form. Since the individually coated terminals can be connected together by connecting plastic links, the said individual plastic coated terminals can be separated without exposure of any metal at the point of separation.

In accordance with yet another feature of the invention two or more extruding heads can be employed at the same or at different angles with respect to the rotating turret to produce molten plastic, and if desired, of different composition, into one or more cavities in the mold cavities formed on the perimeter of the rotating turret. More generally, in addition ot one or more extruding heads being positioned adjacent the perimeter of the rotating turret and extruding plastic substantially in a radial direction with respect to said rotation of said turret, additional extruding heads can be placed on one or both sides of the perimeter of the rotating wheel and can be employed to extrude plastic substantially perpendicularly or at some other predetermined angle with respect to the plane of rotation of said wheel, and into different portions of a given cavity on the wheel perimeter.

In accordance with another feature of the invention a plurality of side action core pins can be employed with respect to each of a plurality of extruding heads, with one or more of said side action core pins being employed to position a metal part within the cavity where it becomes encapsulated as part of the final product.

In accordance with yet another feature of the invention a plurality of core pins are rotatably mounted within appropriate bearing-like channel means within the wheel with a coring end of said core pin protruding into the cavities on the perimeter of the wheel and the first end of the said core pins comprising a threaded male-like core end protruding into the cavity and with the other end of said core pin comprising a gear-like arrangement which is positioned to engage a gear rack mounted in a stationary manner upon the frame which is common to the wheel, thereby causing the rotatably mounted core pin to rotate in an angular position to become unscrewed from the female plastic receptacle which has been formed around the threaded end of said core pin when the plastic was forced therein. In one form of this feature of the invention the core pin is mounted substantially radially with respect to the wheel so that the threaded coring end thereof will tend to push the threaded female plastic means formed therearound away from the perimeter of said wheel as said threaded coring end is rotated and in effect unscrews itself from the threaded plastic receptacle.

In accordance with a still further feature of the invention means are provided to cool the plastic elements being formed in the cavities of the wheel as said formed elements leave that portion of the rotational cycle of the wheel wherein the plastic extrusion is occurring. After removal of the cooled plastic elements from the cavities on the wheel perimeter additional means function to dry and clean the cavities in preparation for the next cycle of extrusion of plastic into the cavities.

BRIEF DESCRIPTION OF THE DRAWINGS

The above-mentioned and other objects and features of the invention will be more clearly understood from the following detailed description thereof when read in conjunction with the drawings in which:

FIG. 4 is an exploded view of the principal elements of the side action core pin means of one of the cavities on the wheel perimeter, said core pin means being designed to produce a molded plastic element of a particular configuration as shown in FIG. 4a;

FIG. 4a shows the plastic housing made with the core pin means of FIG. 4;

FIG. 6 is an enlarged view of a form of the extruding head somewhat different from the type shown on a smaller scale in FIG. 1;

FIG. 7 is a sectional view of the extruded head of FIG. 6 taken along the center axis thereof and including a portion of the plastic feed mechanism;

FIGS. 13 and 14 show a plan view of two stages of a structure for inserting non-plastic elements into the cavities prior to the flow of molten plastic therein;

FIGS. 15 and 16 show a plan view of two stages of another structure for inserting non-plastic elements in selected ones of said cavities prior to the flow of molten plastic therein;

FIG. 20 is a perspective view of the outer rim of the rotating wheel with portions broken away to illustrate the action of the radially oriented core pins which have threaded ends to form plastic wire nuts;

FIG. 21 is another perspective view of the structure of FIG. 20 with portions broken away;

FIG. 22 is a perspective view of two cavities on the perimeter of a wheel with core pins both in an open position and a closed position;

FIG. 23 shows a single core pin of the structure of FIG. 22 from a different perspective;

FIG. 24 is a perspective view of the product made with the cavities and core pin configuration of FIG. 22 and also shows contacts and wires installed therein;

FIG. 25 shows a wheel positioning and alignment bracket; and

DETAILED DESCRIPTION OF THE OPERATION OF THE INVENTION

The "Detailed Description of Operation" is organized in the following manner:

I—DESCRIPTION OF FIGS. 1, 2, 3, 4 and 5.
II—DESCRIPTION OF FIGS. 6, 7, 8, 9, 10 and 11.
III—DESCRIPTION OF FIGS. 12, 13, 14, 15 and 16.
IV—DESCRIPTION OF FIGS. 17, 18 and 19.
V—DESCRIPTION OF FIGS. 20 and 21.
VI—DESCRIPTION OF FIGS. 22, 23 and 24.
VII—DESCRIPTION OF FIGS. 25 and 26.

I—DESCRIPTION OF FIGS. 1, 2, 3, 4 AND 5

Figure 1:
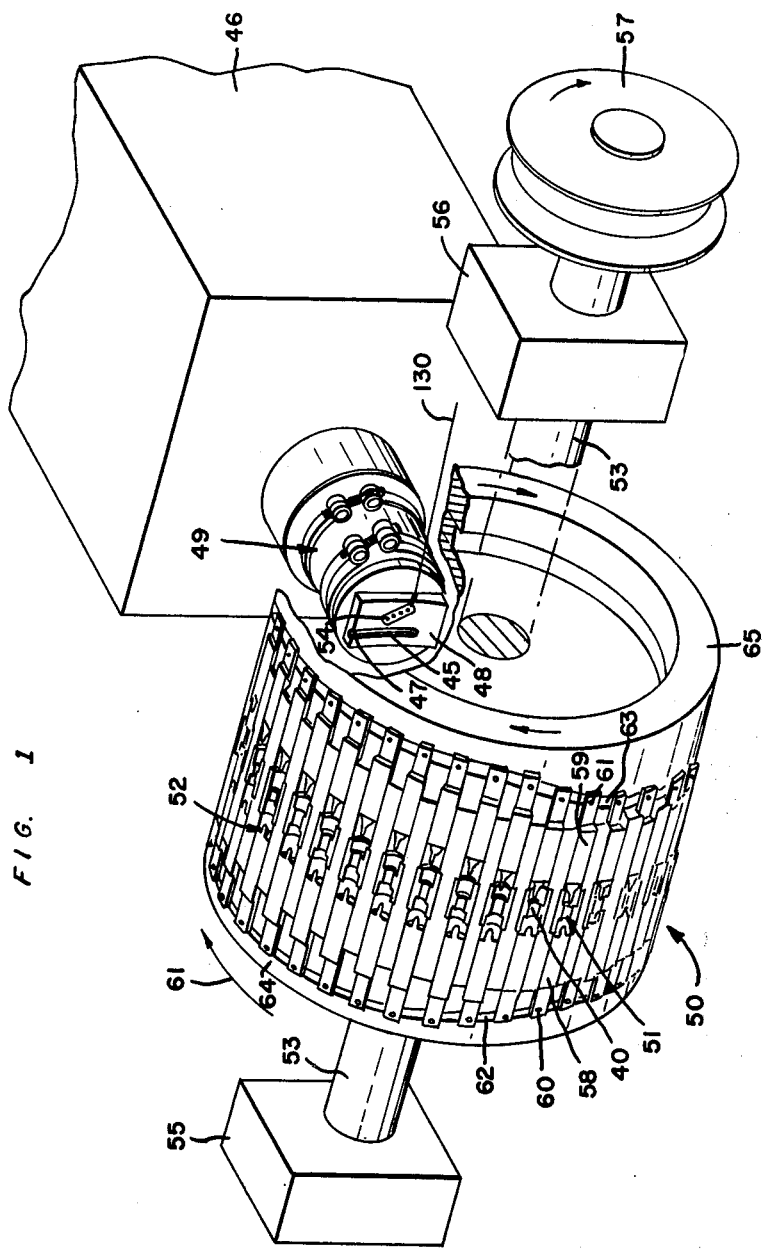
FIG. 1 is a perspective view of the wheel with portions thereof broken away to also show the extruding head.

Referring now to FIG. 1 there is shown the rotatable wheel denoted generally by reference character 50, which is mounted on shaft 53, and is secured in suitable bearing support means 55 and 56. A prime mover, not shown in FIG. 1, rotates the wheel 50 in a counter-clockwise direction by suitable means, such as pulley 57 which is also mounted on shaft 53.

Molten plastic is supplied from source 46 through the orifice 45 in slot 54 on the face 48 of nozzle assembly 49. The said face 48 is concave and is positioned adjacent the circumferential perimeter of wheel 50.

On the perimeter of wheel 50 there is positioned a plurality of cavities into which the molten plastic is forced. Two of these cavities are denoted generally by reference characters 51 and 52, each of which has a pair of movable side action core pins or elements. Specifically, the mold cavity 51 has side action coring assemblies 58 and 59, the elements 60 and 61 respectively of which form a cam track following means which ride in cam tracks 62 and 63 formed respectively in stationary outer rings 64 and 65 in FIG. 1 to move the coring portions of coring assemblies 58 and 59 in and out of cavity 51.

The details of the relationship between the rotating wheel 50, the cam tracks 62 and 63 formed in stationary rings 64 and 65 and the camming action produced thereby on the coring elements 58 and 59 cannot be clearly seen in FIG. 1. Such relationship will be discussed in detail in connection with FIGS. 3, 4 and 5, which illustrate the structural details of these various elements and the movement of the coring elements 58 and 59 in and out of cavity 61 as the wheel 50 rotates through the various phases of its rotational cycle, and moves the cavity 61 past the nozzle 49 to receive the molten plastic. For the present it should be assumed that the foregoing relationship does exist and further that the cam tracks 62 and 63 are formed in the rings 64 and 65 and are stationary with respect to the rotation of the wheel 50.

Figure 2:
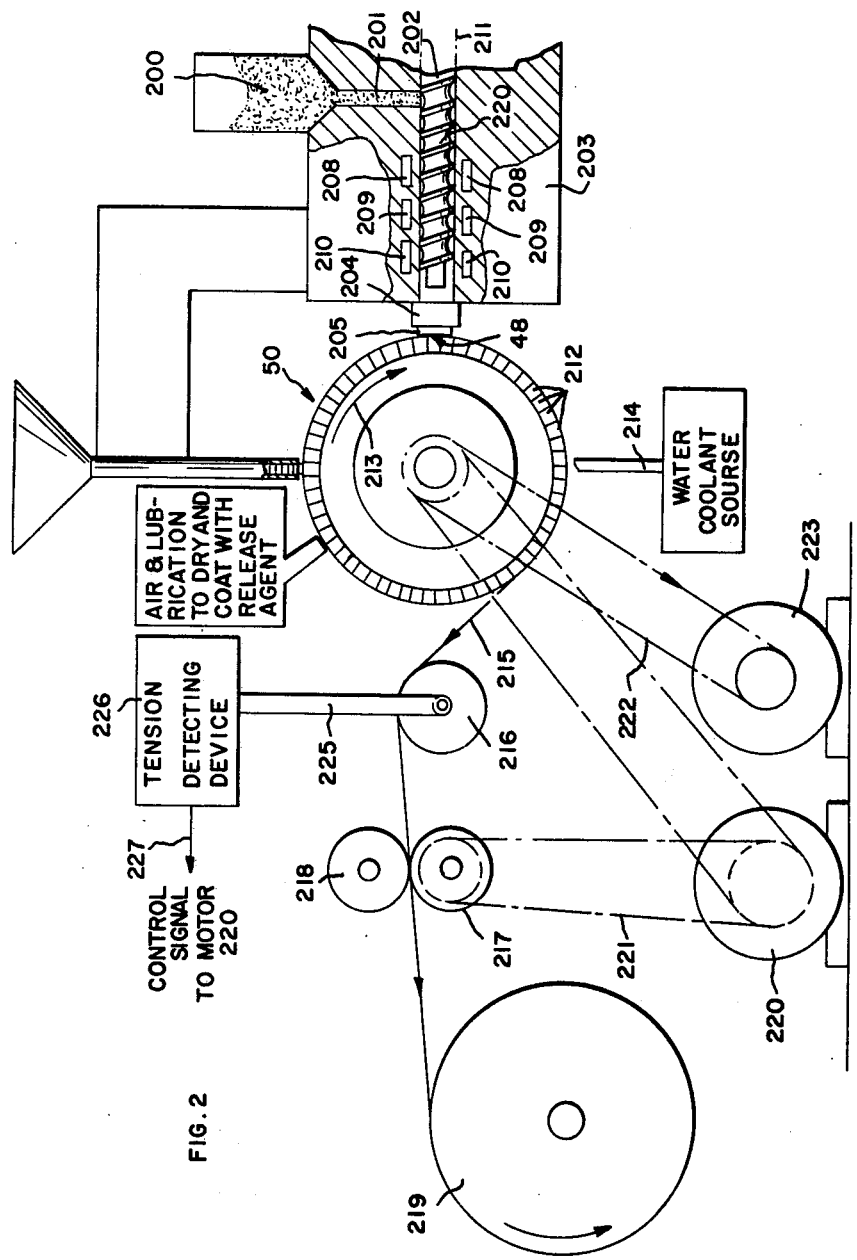
FIG. 2 is a schematic diagram of the entire system including the plastic extruding means, the wheel, the take-up reel, the insertion element mechanism, the cooling and cleaning means, and the prime moving source.
Figure 3:
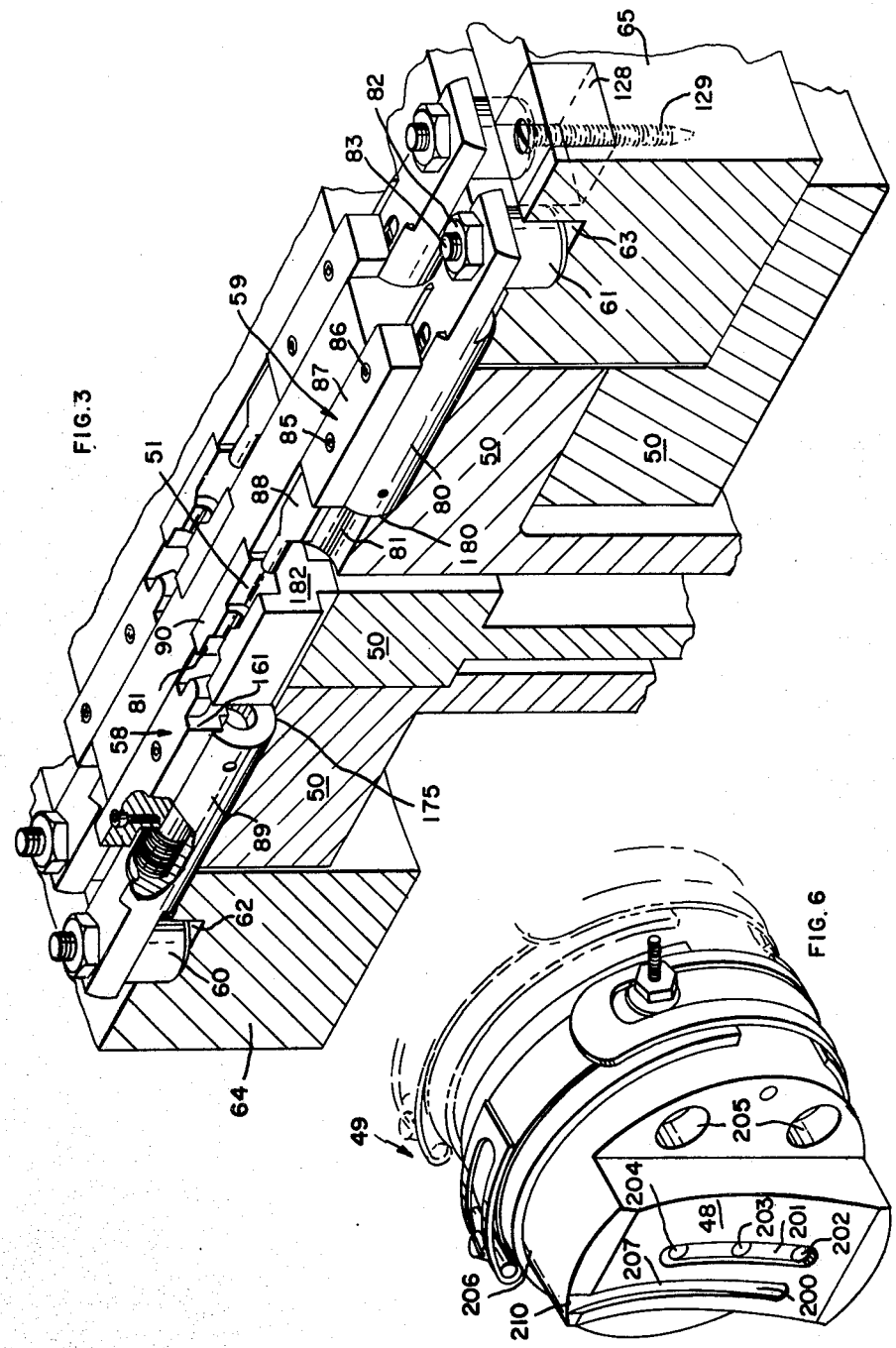
FIG. 3 is a perspective view of a small portion of the perimeter of the wheel showing two of the cavities, each having two side action core pins in their open (withdrawn from the cavity) position.
Figure 4:
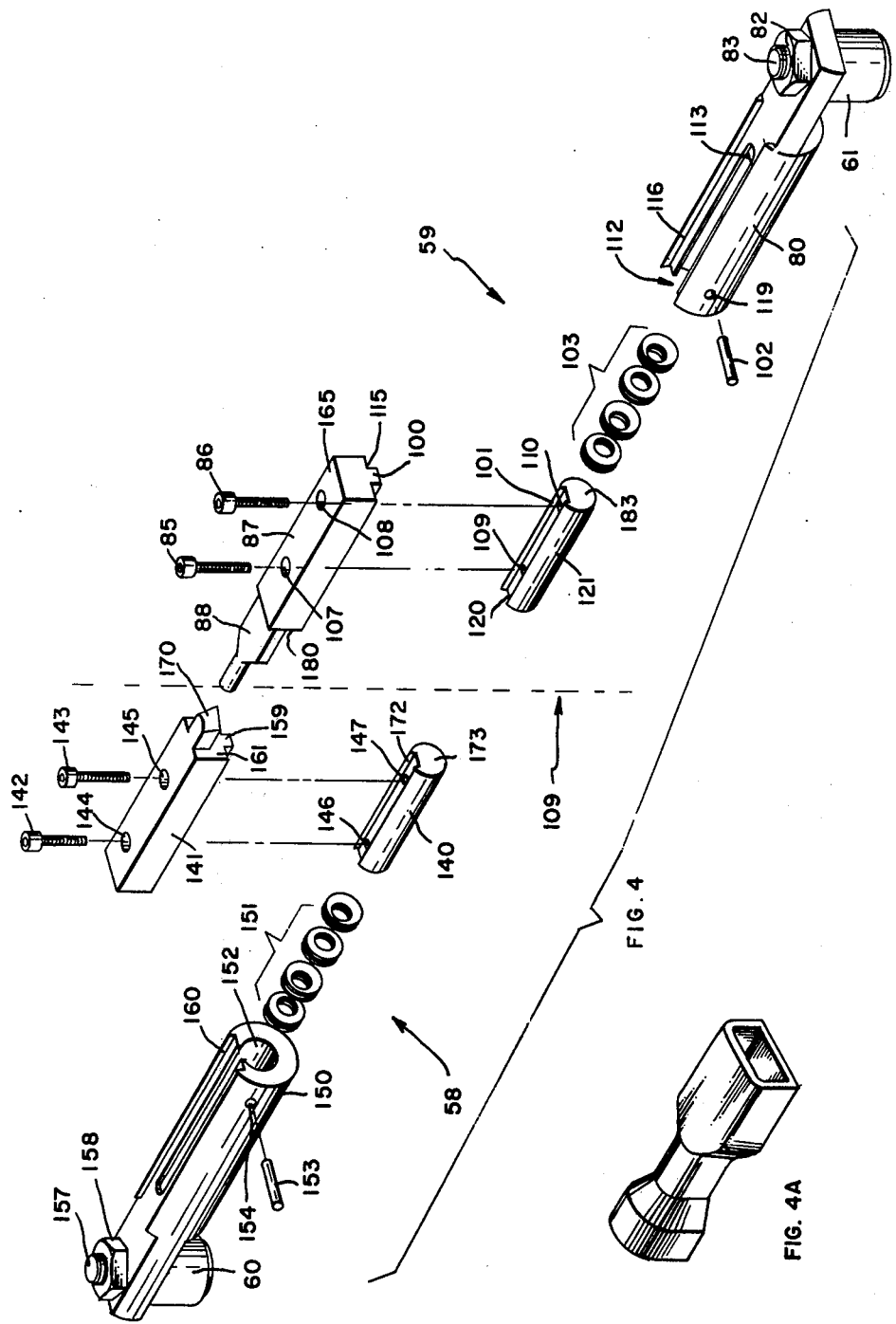
Figure 5:
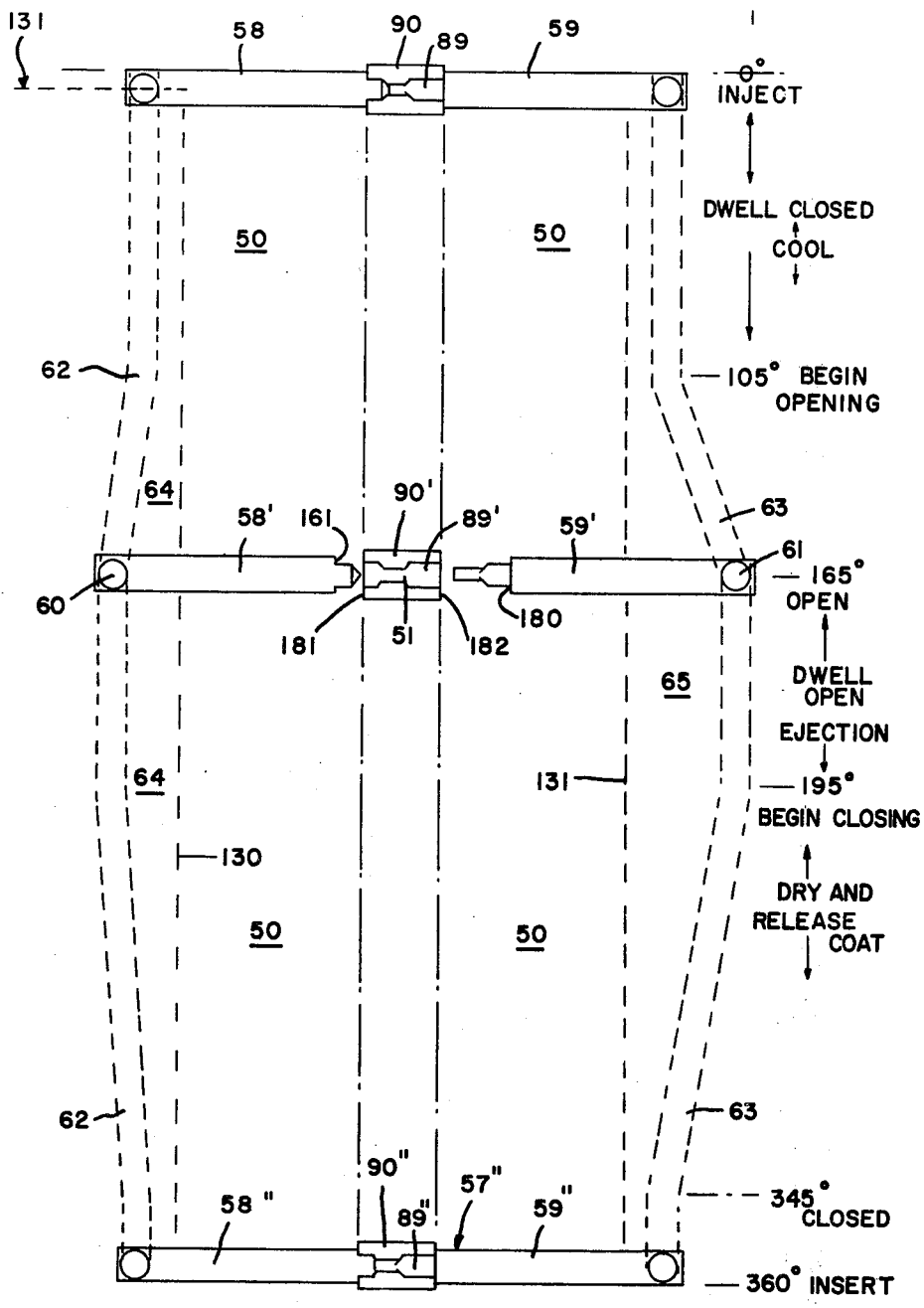
FIG. 5 is a timing chart showing the position of the side pins of a given mold cavity as the turret rotates through 360° carrying the given mold cavity completely around one cycle of operation.

Before proceeding with a discussion of FIGS. 3, 4 and 5, however, reference is made to FIG. 2 which shows the general schematic diagram of the overall system. In FIG. 2 pellets of plastic are supplied from hopper 200 to a screw feed mechanism 202 by means of tube 201. The plastic can be Nylon plastic, copolymers, polypropelene, polysulfone, polypheneleneoxide, or others. The hopper 200 is mounted on top of a suitable frame 203 which also retains the screw feed mechanism 202 as well as heating elements 208, 209 and 210 which are positioned around the screw driving means 202 to maintain the plastic in a desired molten condition as it moves from right to left, as shown by the arrow 211, in FIG. 2.

Each of the heating elements 208, 209 and 210 can be separately controlled in order to maintain the molten plastic at the proper temperature as it moves along the screw drive means 202, then into the extruding head 49 and finally into the nozzle element 205 which actually contains the extruding apertures, such as apertures 45 and 46 of FIG. 1.

The molten plastic is forced into the cavities 212, each of which corresponds to cavity 51 of FIG. 1, for example, as said cavities 212 pass by the extruding head 205 on the rotating wheel 50. When wheel 50 has rotated about 90° after the molten plastic has been extruded into one of the mold cavities 212, the said plastic is cooled and hardened by means of water being sprayed thereon from source 214.

The resulting strip of plastic products, designated generally by reference character 215, is then taken from the perimeter of wheel 50 and, by means of tension roller wheel 216 and a pair of driven wheels 217 and 218, is collected on take-up reel 219.

It is to be noted that the roller 217 is driven by motor 220 by suitable means, such as belt or chain 221, and in turn drives adjacent roller 218. The motor 223 drives the wheel 50 by a suitable pulley arrangement and belt arrangement designated generally by reference character 222.

It is desired to maintain the tension on the finished strip of products 215 between wheel 50 and the pair of rollers 217 and 218 at a certain level. To control such tension control roller 216 is mechanically connected to arm 225 which in turn is connected to tension detecting device 226. The pulley diameter ratios between motor 223 and wheel 50, and between motor 220 and roller 217, are such that the circumferential velocity of rollers 217 and 218 is somewhat greater than that of wheel 50. Thus, the rollers 217 and 218 will maintain a certain degree of tension upon the plastic strip supplied therebetween from wheel 50. However, if the tension becomes too great or too small the free running 216 will move downwardly or upwardly, causing the arm 225 to also move downwardly or upwardly, and thereby activating the tension detector device 226 to supply a signal via control lead 227 back to the motor 220 to correct the speed thereof.

Referring now to FIG. 3 there is shown an enlarged and detailed perspective view of two cavities and the side action core assemblies associated therewith. More specifically, the side action coring assemblies 58 and 59, which are associated with cavity 51 can be seen to be comprised of a number of parts. Consider core pin assembly 59, for example. The assembly 59 consists of a cylindrical section 80 which rides in a cylindrical groove 81 formed in the perimeter of the wheel 50. At the right hand end of the cylindrically-shaped element 80 there is a guiding element or cam track follower means 61 which is secured to element 80 by suitable means, such as nut 82 and bolt 83. The cam track follower element 61 rides in the groove or track 63 which is formed in the stationary disc 65.

Mounted on the top surface of the cylindrical element 80 by bolts 85 and 86 is coring element 87 which has a spade-shaped core pin 88 formed on the left hand end thereof. In its withdrawn position, as shown in FIG. 3, the spade-shaped core pin 88 is completely out of the cavity 51 formed by cavity walls 90. When the plastic is forced into cavity 51 by the nozzle assembly 49 of FIG. 1, as said cavity 51 is passing the face 48 of said nozzle assembly 49, the core pin 88 will be in its inserted position in cavity 51. The other core pin 58, which also enters cavity 51, is mounted on cylindrical element 89 and is activated by a cam track follower means 60 which rides in groove 62 of cam track follower 62.

Referring now to FIG. 4 there is shown an exploded view of the side action coring assembly 59 of FIG. 3 and also an exploded view of the associated side action coring assembly 58. In FIG. 4 the various parts of the coring assembly 59 lie to the right of the dotted line 109. The element 105 of coring assembly 59 has a flange or ridge 100 on the bottom thereof which fits into a groove 101 in the cylindrical portion 121. The screws 85 and 86 pass through holes 107 and 108 provided therefor in element 105 and then into threaded holes 109 and 110 in cylindrical portion 121 to secure the portion 106 onto said cylindrical element 121. Bellville washers 103, which form a spring, are then inserted into the inner cylinder 112 of element 80. The element 121, with the element 105 screwed thereon, is then also inserted into the cylindrical opening 112. Next a pin 102 is passed through the hole 119 in element 80 across the front surface 120 of cylindrical element 121 to retain the said cylindrical element 121 within the cylindrical bore 112.

The entire coring assembly 59 is then inserted from left to right into the cylindrical bore 81 (see FIG. 3) on the perimeter of wheel 50, with the cam track following means 61 riding in cam track 63. Such insertion of the cylindrical section 80 into the bore 81 must be done either in the absence of the stationary ring 65 or by suitable access means in the stationary ring 65. Such access means can be in the form of an element 128 of FIG. 3 which can be removed by means of screw 129. The assembly 59 can then be slipped into its proper bore 81 and the element 128 replaced.

Next, the rotating wheel 50 can be rotated so that the next cavity position is aligned with the access means 218, and the next subsequent side action coring assembly inserted into its appropriate cylindrical bore, corresponding to bore 81, in the perimeter of wheel 50.

The coring assembly 58 consists of four principal elements including the cylindrical section 140 and the coring element 141 with the core pin 170 formed on the end thereof. The third and fourth main elements of coring assembly 58 include cylinder 150 having a cylindrical bore 152 therein and a cam track following means 156 secured at the left hand end thereof. The rectangularly-shaped coring element 141 has a ridge 159 along the bottom thereof which fits into the groove 172 of cylindrical element 140. The element 141 is then secured to the element 140 by means of the two screws 142 and 143 which fit through holes 144 and 145 respectively in element 141 and then into the threaded holes 146 and 147 of element 140.

The bell washers 151, which act as springs, are inserted into bore 152 of cylinder 150 followed by cylindrical element 140 with the element 141 mounted thereon. The pin 153 is then inserted through hole 153 in cylinder wall 150 across the end surface 173 of cylinder 140 to retain it within bore 152. The entire coring element assembly 58 is then inserted into a cylindrically-shaped channel denoted generally by reference character 175 of FIG. 3, and corresponding to the semi-cylindrically shaped channel 81 for receiving the right hand side coring assembly 59 of FIG. 3.

As in the case of the right hand coring assembly 59, means must be provided in the stationary ring 64 of FIG. 3 in order to install the guide means 60 into track 62 in said stationary ring 64. Such access means (although not shown in FIG. 3) can be similar to the access means consisting of removable element 128 which is held in place by screw 129 on the right hand side of FIG. 3.

The function of the spring-like bell washers 151 and 103 of FIG. 4 is as follows. It is desired that when the coring elements 58 and 59 are fully inserted into the cavity 51, the shoulders 161 and 180 of coring elements 58 and 59 be abutted flush against the ends 181 and 182 of the chamber walls 90 forming the cavity 51 (see FIG. 3). Since it is difficult to build a rigid structure which will maintain the close tolerances desired, the spring-like washers 151 and 103 are employed to provide the desired tolerances between surfaces 161 and 181 and surfaces 180 and 182. To illustrate, in the absence of the bell washers 103 the shoulder 180 would move to the left beyond the surface 183 (if surface 182 weren't present) in its closed position by virtue of the relative dimensions and positions of the channel 63 and coring assembly 59. However, because of the spring-like action of the bell washers 103, the surface 180 can move into contact with the surface 182 in FIG. 5 and can then stop; the spring washers 103 flexing under the applied pressure.

Worded in another manner, once the surface 180 has come into contact with the surface 182, the rear surface 183 of cylinder 121 will simply compress washers 103, and the entire assembly, including cylinder 121 and rectangular element 87 mounted thereon, will remain stationary.

Referring now to the timing chart of FIG. 5 there is shown the movement of coring elements 58 and 59 with respect to the 360° rotational cycle of the wheel 50. The two coring assemblies 58 and 59 are shown in their closed position at 0°, which point is indicated at the top right hand side in the diagram of FIG. 2, and is also marked "inject". The word "inject" implies that the mold cavity 51 of FIG. 1 is immediately adjacent the extrusion head 49 of FIG. 1. More specifically, the center line 131 of the mold 57 is in line with the horizontal line defined by the arrow 130 of the extrusion head 49 of FIG. 1 and the plastic is flowing into the cavity 51. The clearance between the surface 48 of the extrusion head 49 and the circumferential perimeter of wheel 50 is only about 0.005" to 0.010".

The coring assemblies 58 and 59 remain in their closed position during the dwell period between 0° and approximately 105°, as shown in FIG. 5. After the wheel 50 (FIG. 1) has rotated an angular distance of 105° the tracks 62 and 63 will begin to diverge to cause the coring assemblies 58 and 59 (more specifically the core pins 88 and 170) to withdraw from the cavity 51. Maximum withdrawal core after the wheel 50 has traveled a total angular distance of about 165°, as shown in FIG. 5. The core ends 88 and 170 are now in their maximum withdrawal position and will remain so until the wheel 50 has traveled another 3° of angular distance. Then, after traveling a total angular distance of 195° the tracks 62 and 63 will begin to converge to cause the core pins 170 and 88 of coring assemblies 58 and 59 to begin moving back into cavity 51. Such movement of the core pins 170 and 88 of coring assemblies 58 and 59 into the cavity 51 will continue until the wheel has traveled a total angular distance of 345°, at which time the core pins 170 and 88 of coring assemblies 58 and 59 will be completely inserted into the cavity 51 and will be ready for the next cycle of plastic injection, which occurs at 360° (the equivalent of 0°).

It is to be understood that the plastic elements formed in cavity 51 are removed from wheel 50 before the wheel has cycled a full 360°. As can be seen from FIG. 5 such removal or ejection of the plastic product occurs while the coring elements 58 and 59 are in their maximum withdrawal position between the angular positions 165° and 195° of wheel 50.

II—DESCRIPTION OF FIGS. 6, 7, 8, 9, 10 and 11

Referring now to FIGS. 6, 7, 8 and 9 there is shown therein various views of the nozzle from which the plastic is extruded into the cavities in the rotating wheel. The nozzle assembly includes the nozzle 206 and the means for connecting the nozzle assembly to the extruding mechanism 46 which heats the plastic and then moves the heated, molten plastic into the nozzle assembly 49 and ultimately through the nozzle 206 and into the cavities in the wheel.

Referring specifically to FIG. 6 there is shown a perspective view of the nozzle 206 and a portion of the nozzle assembly 49 which, by definition, includes the nozzle 206. The concave curvilinear surface 48 of nozzle 206 is positioned adjacent the rotating wheel 50 as shown in FIGS. 1 and 2. A series of three orifices 202, 203 and 204 corresponding generally to orifices 45 of FIG. 1, are positioned within a groove 201. The orifices 202, 203 and 204 extend through the nozzle 206 and back into a cylindrical opening 228 (FIG. 7) within the portion of the nozzle assembly 49. The molten plastic is forced out of the orifices 202, 203 and 204 and into the cavities on the rotating wheel perimeter. Since the surface 48 is very close to the circumferential perimeter of the rotating wheel 50, the plastic fills the groove 201 and is forced into the cavities on the perimeter of the wheel as said cavities pass the groove 201.

It is to be noted that the slot 201 is vertically oriented, i.e., it lays along a line which is perpendicular to the rotational axis of the wheel 50 (FIGS. 1 and 2) which rotates thereby in the direction of arrow 208. It is to be further noted that in FIG. 1 the surface 48 of the nozzle is somewhat different than the nozzle of FIG. 6 in that the corresponding groove 54 and the three orifices 46 of the nozzle of FIG. 1 are positioned at an angle with respect to a line which is perpendicular to the axis of rotation of the wheel 50.

While both the diagonally positioned slot 54 and orifices 46 of FIG. 1 and the vertically oriented slot 201 and orifices 202–204 of FIG. 6 function to supply molten plastic into the cavities of the rotating wheel 50 it has been found that the vertically oriented slot 201 of FIG. 6, for most applications, produces a flow of plastic into the cavities with more desirable flow characteristics than that provided by the diagonally positioned slot 54 and orifices 46 of FIG. 1.

Referring again to FIG. 6 there is shown another vertical oriented slot 207 in the face 48 of nozzle 206 without an orifice therein, which is provided to permit the formation of a plastic carrier between plastic products formed in adjacent cavities such as cavities 40 and 51 of the wheel 50 of FIG. 1. More specifically, as the plastic is forced out of the orifices 202–204 of FIG. 6 and into the cavities 40 and 51 as said cavities pass the groove 201, the molten plastic will not only fill the cavities 40 and 51 but will also flow back into slot 207 to thereby provide not only a dimension of products extending into the extruding head but also to provide connecting strips of plastic between plastic products in adjacent cavities and, in fact, form a common carrier for said plastic products.

More specifically, since the wheel 50 is rotating in the direction of arrow 208 past the surface 48 of nozzle 206 the fact that slot 207 extends through the top edge 210 of nozzle 206 will permit the plastic to trail out of the trailing edge of the perimeter of surface 48, i.e. out of said open end 210 and form a continuous strip of plastic around the perimeter of the rotating wheel and which carries thereon the plastic products formed in the cavities of the wheel 50.

Referring now to FIG. 7 the nozzle assembly 49 is shown attached to an extrusion orifice reduction element 212 by means of a ring nut 213. The orifice reduction element 212 in turn is secured to a gate mounting element 225 by means of a ring-shaped flange member 219 and bolts 220 and 221 which extend therethrough and into gate mounting element 225. The said ring flange element 219 has shoulders 227 and 226 formed on the inner circumference thereof which function to lock the orifice reduction element 212 into a fixed position relative to the source 46 of the extruded plastic. More specifically, the orifice 230, which contains the extruding screw 220, is aligned with the large orifice 216 in the orifice reduction element 212 so that the plastic is pushed forward smoothly by screw 220 from the orifice 230 through the screening mechanism 218 and surrounding breaking mechanism 217 and into the large orifice 216 of orifice reduction element 212

The orifice in element 212 is then reduced in size over a transitional surface 215 to a diameter designated by reference character 214, which diameter is equal to the diameter of the orifice 232 in the nozzle support element 231 and the receiving orifice 232 of nozzle 206. The plastic is then forced through the small extruding orifices 202, 203 and 204 and into the cavities of the wheel 50 rotating past the surface 48 of nozzle 206, as discussed hereinbefore.

Figures 8, 9:
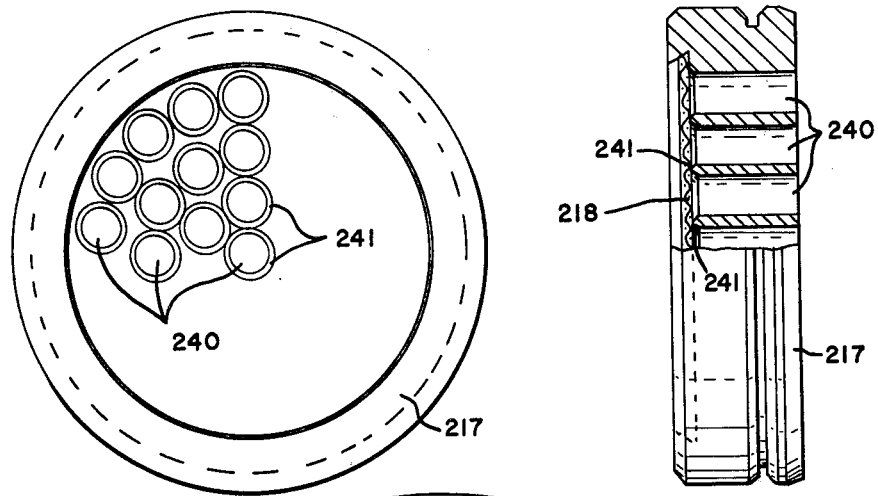
FIG. 8 is a detailed view of the feed mechanism shown in FIG. 7.
FIG. 9 is a side view of the structure of FIG. 8 with a portion thereof broken away.

The function of the screening element 218 and the breaker plate 217 is to break up any lumps of molten plastic and to, in effect, make the viscosity of the molten plastic uniform as it enters the orifice reduction element 212 and flows forward into the nozzle 206. The screening element 218 can be formed of two 40 mesh screens placed one upon the other for added strength in one preferred form of the invention. In FIGS. 8 and 9 the breaker plate 217 is shown in detail and can be seen to consist of a plate having a plurality of orifices or holes 240 formed therethrough, and each with a counter sunk rim designated by reference character 241. The counter sunk rim is positioned adjacent the number 40 mesh screening 216 as indicated in FIG. 9.

Heating elements 235, 230 and 231, which can be toroidal shaped, extend completely around and heat the orifice reduction element 212, the screen 218 and nozzle support element 231 and thereby function to aid in maintaining the plastic at a desired temperature in order to obtain a desired viscosity thereof.

The nozzle 206 is secured to the nozzle support element 231 by suitable means such as screws 237 and 238, the heads of which are retained in bores 205. Such bores 205 are shown more clearly in FIG. 6.

Figure 10:
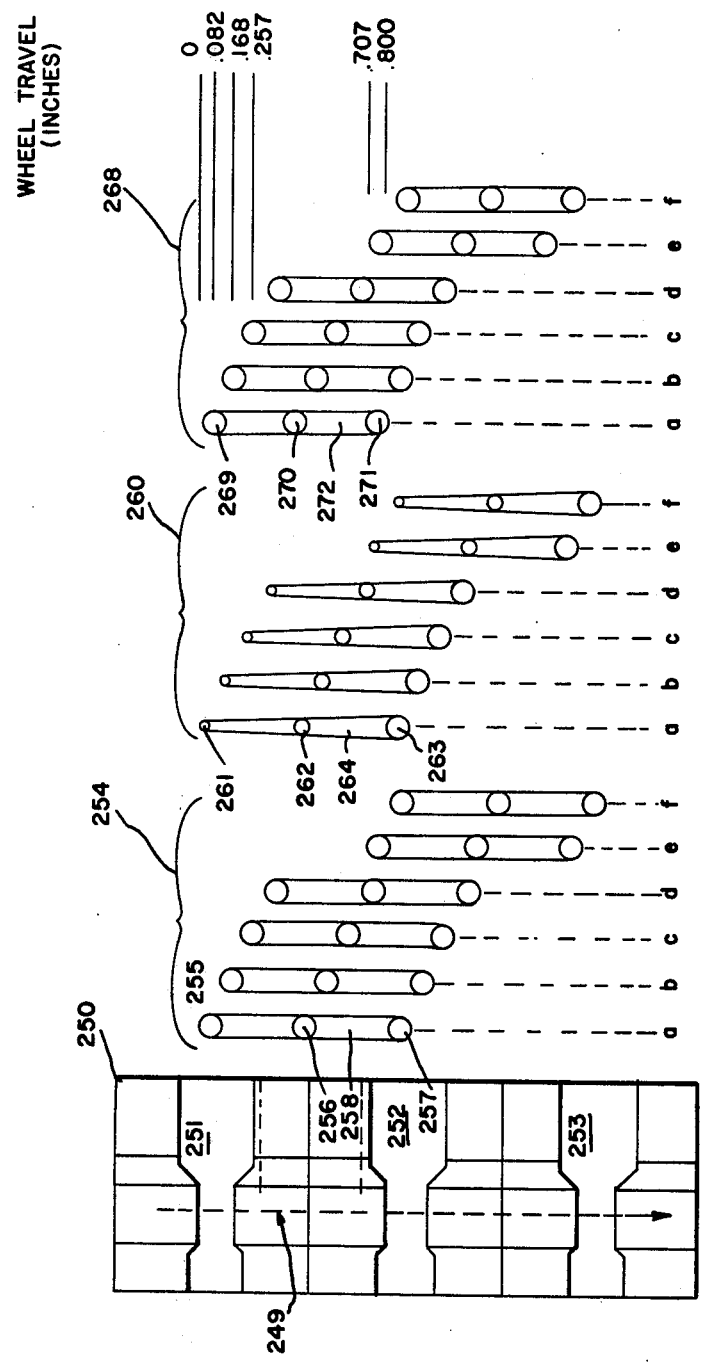
FIG. 10 is a chart showing three different configurations of holes in the extruding nozzle head and their relation to the cavities in the wheel perimeter as the wheel passes by said nozzle.
Figure 11:
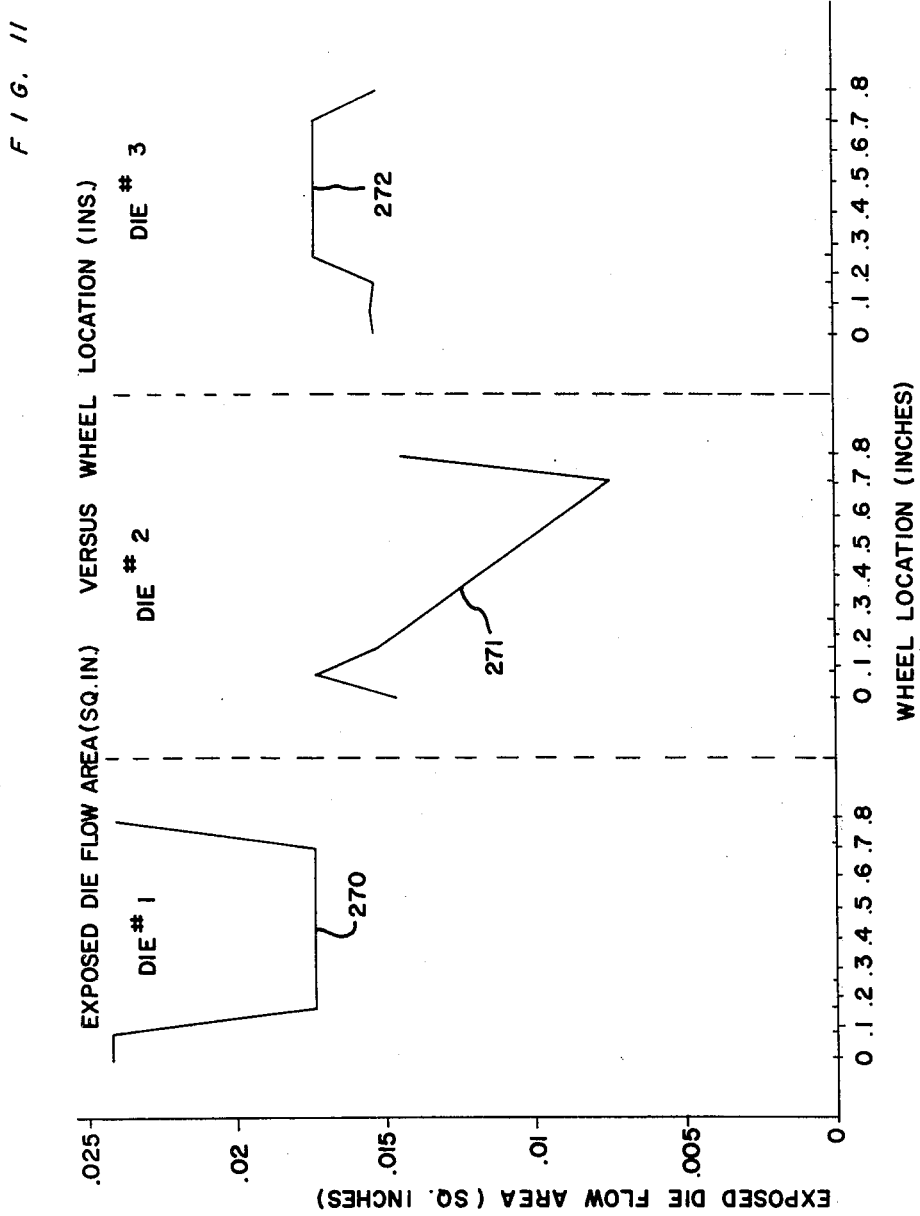
FIG. 11 shows three curves showing the area of plastic flow in the nozzle head exposed to the cavities for the three different hole configurations of FIG. 10 as said cavities in the wheel perimeter pass by the hole configuration.

Referring now to FIGS. 10 and 11 there is shown the relationship between the die flow area on the face of the nozzle with respect to the cavity area on the rotating wheel which is exposed to said die flow area, for three different die designs.

More specifically, in FIG. 10 there is shown at the left thereof a segment 250 of the rotating wheel 50 (FIG. 1) with three cavities 251, 252 and 253, indicated schematically thereon. Adjacent the wheel segment 250 are three different die designs each shown in different positions with respect to the rotating wheel under one of the brackets 254, 260 and 268. Each of the three die designs is also designated by the reference characters 254, 260 and 268. For example, under bracket 254 there is shown a die design 254 consisting of three orifices 255, 256 and 257 positioned in the vertically aligned groove 258. It is to be understood that the three orifices 255, 256 and 257 and the slot or groove 258 correspond to the orifices 202, 203, and 204 and slot 201 of FIG. 6. Six positions of the die design 254 designated as positions a, b, c, d, e and f are shown, with each position representing a relative position of the die design 254 with respect to the wheel.

The paths of all three dies 254, 260 and 268 is along the dotted line 249 in FIG. 10. At the right of FIG. 10 the Y axis is shown to be measured in inches of wheel travel. The X axis is measured in mutually exposed die flow area and cavity area of the wheel.

To illustrate further the meaning of FIG. 10 consider die design 254. At position "a" the orifice 255 is fully exposed to cavity 251 and the orifice 257 is fully exposed to cavity 252. The orifice 256 is not exposed to any cavity. However, portions of the slot 258 are exposed to both cavities 251 and 252.

The curve 270 of FIG. 11 shows graphically the relationship between the area of die 254 exposed to the cavities 251, 252 or 253 of FIG. 10 versus the relative location of the wheel. It is to be noted that the exposed die flow area and wheel location of the curve 270 of FIG. 11 are calculated from the exposed die flow area and wheel location as shown and indicated in FIG. 10.

The die design under the bracket 260 of FIG. 10 is different than die design 254 in that orifice 261 is smaller than orifice 262 which in turn is smaller than orifice 263, all of which fit into a slot 264 whose sides are convergent rather than parallel, as is the case of die design 254. As is die design 254, the die design 260 is shown in six different positions indicated by positions a, b, c, d, e and f under bracket 260. The relationship of exposed die flow area versus wheel location for die design 260 is shown in the curve 271 of FIG. 11.

The third die design under the bracket 268 in FIG. 10 is also shown in six different positions a, b, c, d, e and f with respect to the position of the wheel segment 250. The relationship of exposed die flow area to wheel position of die 268 of FIG. 10 is shown in curve 272 of FIG. 11.

It is apparent from the three curves 270, 271 and 272 that various exposed die flow area versus wheel location characteristics can be obtained by changing either the size of the orifices in the die or by changing the distances between said orifices, or a combination of both. The particular spacing and respective sizes of the orifices in a given die design is dictated by the particular shape and spacing of the cavities on the perimeter of the wheel, which cavity shapes are in turn determined by the product being manufactured.

As a general rule it is desirable to maintain the exposed die flow area substantially constant as the wheel rotates, inasmuch as abrupt changes in die flow area tend to result in abrupt changes in the rate of flow and in the pressure of the molten plastic as it extrudes out of the orifices in the nozzle. Such changes in rate of flow and pressure of the plastic can result in turbulence in the flowing plastic with resulting incomplete filling of the cavities in the perimeter of the wheel or the production of internal strains and stresses in the plastic as it cools within the cavities. Such internal strains and stresses can result in failure of the housings either mechanically or electrically at a later date.

It should also be noted that the use of a vertical slot, such as any of the slots 258, 264 and 272 of FIG. 10 which lay along a line perpendicular to the axis of rotation of the wheel, permits the flow of plastic continuously into the same area of the cavity as the cavity moves past said slot. This sustained flow of plastic into the same area of the cavity produces optimum flow characteristics for many different configurations of cavities, particularly those where the flow of plastic to all extremities of the cavities can be obtained by injecting the plastic at a single point. There are certain types of cavities in which the plastic must be injected at two or more points in order to reach the extremities of the cavities. In such cases configurations of orifices and slots other than those shown in FIG. 10 can be utilized advantageously. For example, the angular positioning of the slot 54 of FIG. 1 with respect to the plane of rotation of the wheel 50 will produce a more efficient flow of plastic into the cavity in certain cases where plastic must be injected at two or more points.

In other applications two sets of orifices formed in two separate slots, which can be parallel with each other or in a generally V-shaped configuration with respect to each other, can be employed to inject plastic into cavities which require certain injection characteristics.

The particular configuration of orifices and slots in which said orifices are positioned in the nozzle must be calculated for each particular cavity configuration. Various techniques for calculating the optimum positioning of orifices and slots to produce an optimum flow of the plastic from the nozzle into cavities are well known in the art. One such method for determining flow is discussed in considerable detail in an article entitled "Flow Analysis Network (FAN)—A Method for Solving Flow Problems In Polymer Processing" appearing in the Sept. 1974, Polymer Engineering and Science publication, volume 14 number 9.

III—DESCRIPTION OF FIGS. 12, 13, 14, 15 AND 16

Figure 12:
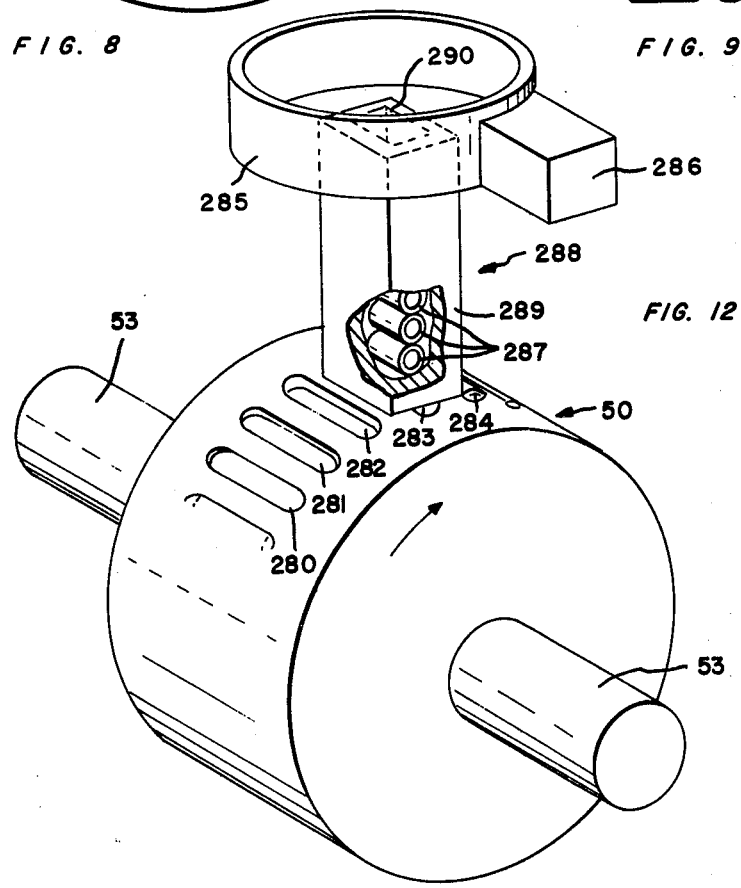
FIG. 12 is a perspective view of a structure for inserting a non-plastic element into the wheel perimeter cavities prior to the flow of plastic therein.

Referring now to FIG. 12 there is shown a perspective view of the rotating wheel 50 mounted on its axis 53 and a means 288 for inserting preformed elements, such as metal ferrules 287, into the cavities, such as cavities 280, 281, 282, 283 and 284 on the perimeter of the wheel 50.

The insertion mechanism 283 consists of a reservoir 285 which contains a large number of the ferrules 287 in loose form. A vibrator 286 can be employed to vibrate the ferrules 287 into the aperture 290 in the vertical shaft 289. The bottom of the shaft 289 terminates near the surface of the perimeter of wheel 50 so that as the cavities, such as cavities 280 through 282, pass under shaft 284 one of the ferrules 287 will drop into each cavity.

Reference is made to FIGS. 13 and 14 which show two relative positions of the wheel 50 with respect to the shaft 289. In FIG. 13 ferrules 291, 292 and 293 have been dropped into cavities 282, 283 and 284, respectively, and the ferrule 294 will be dropped into the cavity 281 when the wheel rotates further in the direction of the arrow 296.

FIG. 14 shows the relationship between the shaft 284 and the cavity 281 after the wheel is rotated a few degrees further than its position in FIG. 13. It can be seen that ferrule 294 is about to drop into cavity 281 and that the next ferrule 295 will then drop down near the surface of the wheel 50 and will subsequently drop into cavity 280 as the wheel rotates further in the direction of arrow 296.

Referring now to FIGS. 15 and 16 there is shown a structure wherein elements, such as ferrules 326 and 330, can be dropped selectively into the cavities, such as cavities 305 through 311, of wheel 50. The ferrules are stacked vertically, one upon the other, in a shaft-like container 300. An escape feed mechanism 301 is activated by means of a lever 302 to pass one of the ferrules through said escape feed mechanism 301 and onto the surface of the wheel 50 so that said one ferrule element will drop into the next cavity to pass thereunder.

In FIG. 15 the lever 302 is about to be activated by pawl 312, which is located on the perimeter of the rotating wheel 50, to release the ferrule element 326 through the escape feed mechanism 301. In FIG. 16 the pawl 312 has passed the lever 302 and has thereby caused activation of the escape feed mechanism 301 to drop ferrule element 326 onto the surface of wheel 50. It can be seen from FIG. 16 that when the wheel 50 rotates a degree or two more in the direction of arrow 296 the ferrule 326 will drop into cavity 307. The cavities 308, 309 and 311 have already passed under the vertical shaft 300 and each of the cavities has received a ferrule 320, 321 and 322, respectively, therein. The cavity 310, however, has no ferrule therein since there is no adjacent pawl located on the perimetric surface 328 of the wheel 50 to activate the lever 302. Thus, by the presence or absence of pawls, such as pawls 304 and 312 the ferrules are inserted into selected ones of the cavities on the perimeter of the wheel 50.

IV—DESCRIPTION OF FIGS. 17, 18 AND 19

Figure 17:
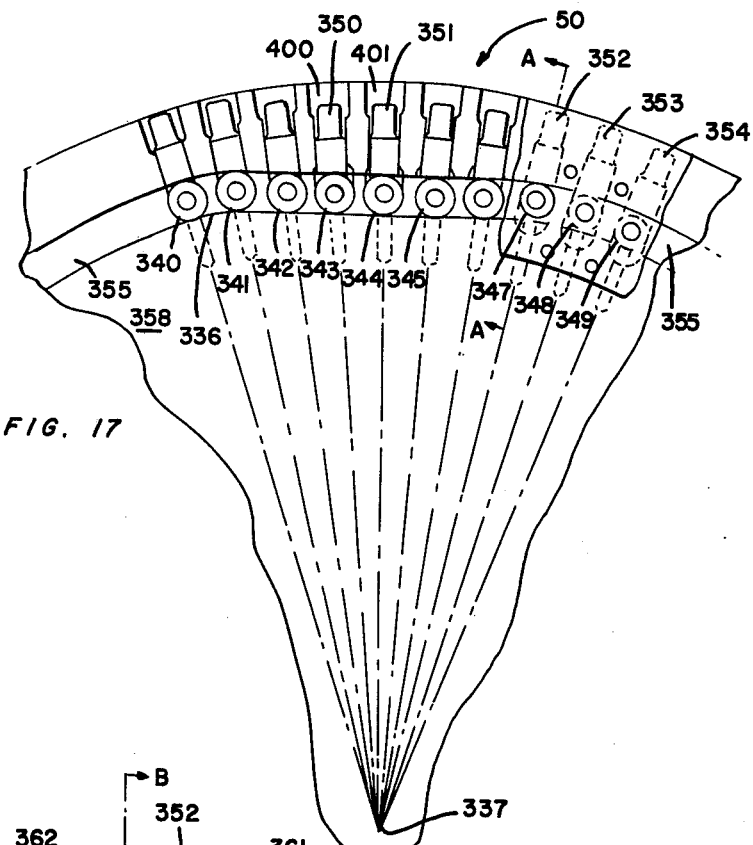
FIGS. 17, 18 and 19 show a structure wherein core pins are activated to move radially with respect to the wheel axis in and out of the cavities depending upon the angular position of the wheel.
Figure 18:
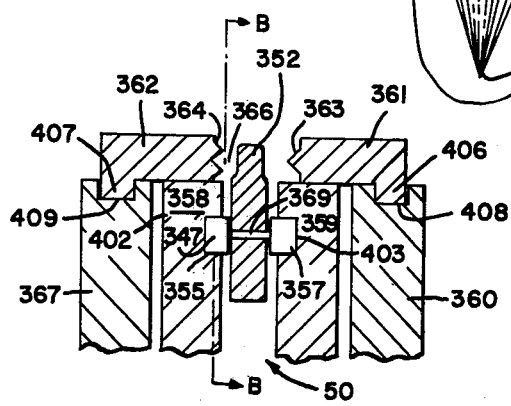
Figure 19:
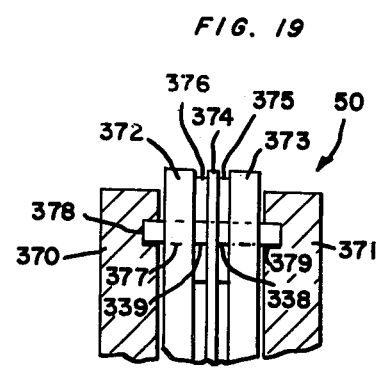

Referring now to FIGS. 17, 18 and 19 there is shown a form of the invention in which core pins are activated by cam tracks and cam track follower means to move radially in and out of cavities, depending upon the particular position of the wheel 50 in its cycle of revolution. More specifically, in FIG. 17, which is a sectional view of FIG. 18 taken along the plane B—B, there is shown a cam track 355 in which rides a plurality of first cam track follower means 340 through 349. The cam track 355 is formed on stationary disc 358.

As shown in FIG. 18, which is a sectional view of FIG. 17 taken along the plane A—A, there is shown a second cam track 357 formed in a second stationary disc 359 and parallel to cam track 355, and a set of second cam track follower means, such as cam track follower means 403, on the other side of one of the radially oriented core pins 352. The cam track follower means 403 is connected to a cam track follower means on the first side of core pin 352, such as follower means 347, by means of a pin 365 which passes freely through an aperture in the core pin 352.

In operation each pair of the cam track follower means, such as follower means 347 and 403 of FIG. 18, will follow the path of cam tracks 355 and 357 as the wheel 50 rotates and moves the follower means therewith. As indicated above the cam tracks 355 and 357 follow a circular path for most of their length around the stationary discs 358 and 359. However, as can be seen in FIG. 17, at point 336 the track 355 bends so that all of the cam follower means, as they reach point 336, will begin to move inwardly towards the axis of rotation 337 of the wheel 50, thereby pulling the attached core pins downward towards point 337 and out of their cavities.

Referring now to FIG. 19 there is shown another modification employing radially oriented core pins. Two core pins 376 and 375 are secured at their lower ends 339 and 338 to a cam track follower means 377, the ends of which ride in cam tracks 378 and 379 located in stationary plates 370 and 371.

The elements 372, 374 and 373 are part of the wheel, designated generally by reference character 50. As in the case of the structure of FIGS. 17 and 18 the two pins 376 and 375 move radially back and forth to enter or withdraw from the cavities, depending upon the pattern of the cam tracks 378 and 379.

V—DESCRIPTION OF FIGS. 20 AND 21

Referring now to FIGS. 20 and 21 there is shown a structure for manufacturing wire nuts having the general shape of a conical frustum with a threaded interior. FIG. 20 shows the outer rim 399 of a segment of the rotating wheel 50. Also shown are a plurality of the plastic wire nuts 380–385 which have been found on the wheel and are in progressive stages of being removed from said wheel. More specifically, at the left hand end of FIG. 20 the plastic nut 380 has been formed in a cavity on the surface of the wheel and at the right hand side of FIG. 20 the threaded nut 385 is being forced off the threaded die 404 and away from the surface of the wheel so that it can be collected on a suitable means, such as a take-up reel.

The plastic nuts in-between the two extreme nuts 380 and 385, namely nuts 381–384, are shown in various stages of removal from their threaded cores, such as for example, threaded cores 402 and 403 associated with nuts 383 and 384.

Also associated with each threaded nut being formed are a pair of side action dies, one die being on each side thereof. In FIG. 20 only one of the dies of each pair is shown. These single side action dies are identified by reference characters 392 through 397 respectively.

In FIG. 21, which is a sectional view of FIG. 20 taken in a plane passing through the axis of the wheel, a typical pair of side action dies for each cavity can be more clearly seen. More specifically, the two dies 392 and 415 forming the cavity 379, will, after the threaded nut 380 has been formed in cavity 397 around threaded core pin 410, move to the left and to the right, respectively, in the direction of arrows 418 and 419, so that the plastic nut 380 can be removed. Actual removal of such plastic nut is effected by rotating the gear 386 which is attached to threaded core pin 410 through shaft 392. The said shaft 392 passes through an aperture in the rim 399 of the wheel 50. Thus, as the wheel 50 moves inwardly into the plane of the paper containing FIG. 21 the circular gear 386 will rotate on stationary gear rack 401 and will cause the threaded die 410 to unscrew itself from the plastic nut, and thereby force the plastic wire nut outwardly, that is upwardly in FIG. 21 and away from the wheel 50.

Immediately prior to the engagement of gear 386 with gear rack 401 the two die elements 392 and 415 will have been moved outwardly in the directions of arrows 418 and 419, respectively, to permit the threaded nut 380 in cavity 379 to move upwardly and away from wheel 50. The mechanism from moving the die elements 392 and 415 side-ways in similar to that discussed in connection with FIGS. 1, 3, 4 and 5.

It is to be noted that molten plastic is forced not only into the cavity 379 around the threaded die 410, but is also forced into the narrow slot 417 to create a carrier strip Such a carrier strip is shown in FIG. 20 as carrier 400 and connects together all of the threaded wire nuts 380 through 385.

Many variations of the threaded and rotating core pin concept shown in FIGS. 20 and 21 will be apparent to one skilled in the art. For example, it is not necessary that the threaded core pins or dies be positioned radially with respect to the wheel. Such threaded core pins can be positioned parallel to the axes of rotation of the wheel with an activating stationary gear rack adjacent the side of the wheel. Further, such threaded core pins can be caused to retract from the female plastic receptacle that they have formed rather than to push the formed female receptacle away therefrom. More specifically, the threaded dies can be made to unscrew and simultaneously, by appropriate camming action, also to withdraw from the cavity and the threaded female receptacle which they have formed therein. Such withdrawal of the threaded core pin is particularly suitable when the threaded core pins are aligned substantially with the axis of rotation of wheel 50, and would therefore have a type action which has been defined hereinbefore as a side action.

VI—DESCRIPTION OF FIGS. 22, 23 AND 24

Referring now to FIG. 22 there is shown a form of side action pin assemblies, such as assemblies 431 and 430, each of which has a multiple number of individual coring pins, such as coring pins 434 and 436. The aforementioned multiple coring pin assemblies are mounted on the perimeter of the wheel 50 and function to produce the product shown in FIG. 24. It is to be noted that the product of FIG. 24 is shown in an assembled form, with contacts 453 through 456 installed therein, as well as conductors 451. It is also to be noted that the afore-mentioned contacts and the conductors are not formed by the action of core pins 430 and 431 of FIG. 16, but are installed in the housing at a later time.

In FIG. 22 the core pin assemblies 431 ad 430 are shown in their separated position which enables the housing which has been formed therebetween to be removed from the perimeter of the wheel 50. The core pin assemblies 432 and 433, however, are shown in their closed position in which the molten plastic is forced therebetween from an extruding head (not shown) in the direction of the arrow 438. As indicated above, the individual core pins 434 and 436 form the configuration of the cavity 445 of FIG. 22. A perspective view of the front of one of the elements 436 of FIG. 22 is shown in FIG. 23.

In FIG. 22 only a very small portion of the perimeter of the wheel 50 has been shown. There are, in fact, many pairs of core pin assemblies, such as core pin assembly pair 430 and 431, positioned around the perimeter of the wheel 50.

VII—DESCRIPTION OF FIGS. 25 AND 26

Referring now to FIG. 25 there is shown a structure for maintaining a desired distance between the nozzle assembly 49 and the perimeter of wheel 50. Such spacing is critical since if the nozzle 49 is too far from the wheel 50 the molten plastic will flow in areas therebetween where it should not flow. If the spacing is too close the wheel will bind against the face of the nozzle assembly 49.

In FIG. 25 the plates 461 and 468 are stationary with respect to the nozzle assembly 49, and are joined together by support bars 464, 465 and 466. The axis 53 of wheel 50 is mounted upon plates 462 and 463 which also support the non-rotating discs 64 and 65 of FIGS. 1 and 3, which contain the cam tracks 62 and 63. The plates 462 and 463 are firmly secured to plate 467, which is movable in a direction normal to its surface and is thereby able to move the wheel 50 towards and away from the nozzle assembly 49.

A pair of identical, pivoted lever arrangements 480 and 475 are coupled from their center pivot points 473 and 481 to the bifurcated end of shaft 469 by linkages 474 and 476.

The shaft 469 is movable, in the direction of its axis by suitable means, such as a hydraulically operated piston (not shown), to shorten or lengthen the length of the pivoted lever arrangements 480 and 475, and thereby move the plate 467 and the wheel 50 towards or away from the nozzle assembly 49 to provide gross positioning of the wheel 50.

To correct for small, directional misalignments of the wheel axis 53, nuts, such as nuts 482 and 483, on the threaded ends of rods 464–466 can be tightened or loosened, thereby shortening or lengthening one of the pivoted lever arrangements 480 or 475.

Figure 26:
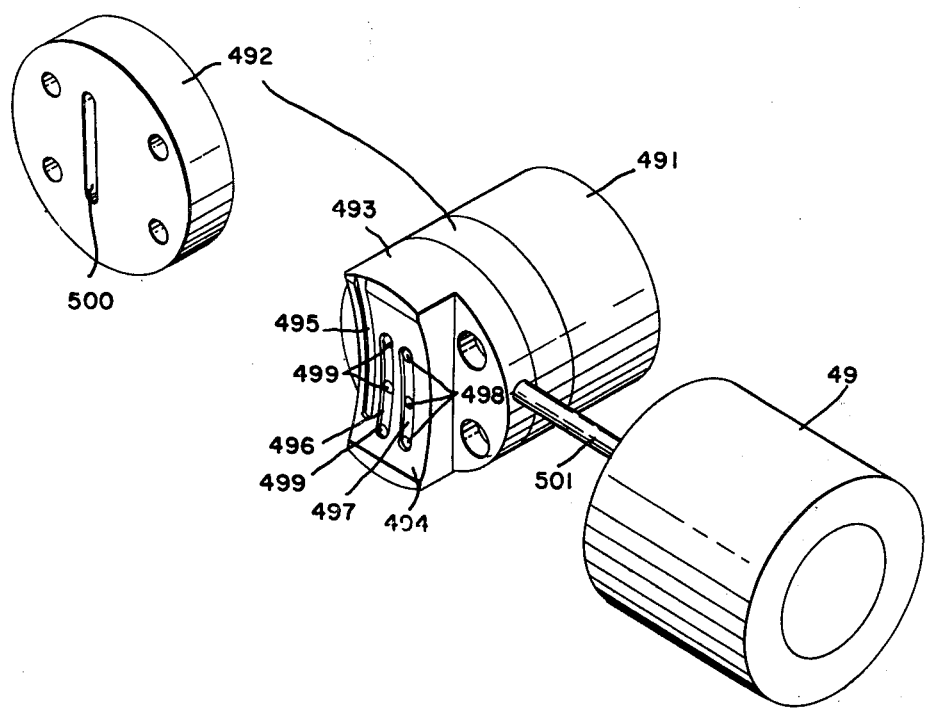
FIG. 26 shows a dual extrusion nozzle assembly.

Referring now to FIG. 26 there is shown a dual extrusion head for injecting two different types of plastic into a cavity on the wheel, which is not shown in FIG. 26 but which could be the wheel 50 of FIGS. 1 and 3.

Two different types of plastic are desirable in many plastic devices. For example, in certain types of connector housings it is necessary to crimp a contained terminal. The plastic covering such terminal should have certain properties of flow so that the housing will also take a crimp. Other portions of the housing might require a plastic having a high structural strength with good memory characteristics and be relatively resistant to an applied force.

In FIG. 26 a first type of plastic is supplied through nozzle assembly 490, tube 501 and orifices 498 in slot 497. The slot 495 functions to provide a dimension of the product into the nozzle assembly 490 and also to provide a carrier strip for the plastic products formed. To maintain separation of the two types of plastic within the nozzle head 493 a disc 492 having a gating slot 500 therein is employed. The gating slot 500 is aligned with the slot 496 and allows the plastic from nozzle assembly 491 to enter only the orifices 499. The plastic from nozzle assembly 491 is prevented from entering the orifices 498 by element 492. Only the plastic from nozzle assembly 490 enters the orifices 498.

It is to be understood that the forms of the invention shown and described herein are but some preferred embodiments and that various alternatives can be employed as to proportions, configurations of coring pins and permutations of coring pins and direction of insertion and withdrawal.

I claim:

1. A method for making plastic products comprising the steps of:
    rotating a wheel having first cavities formed in the circumferential perimeter thereof past a plastic extrusion means;
    moving coring pins parallel to the axis of rotation of said wheel into said first cavities prior to said cavities passing said plastic extrusion means;
    extruding molten plastic into said first cavities as said first cavities pass said plastic extrusion means to form said plastic products and also into second cavities joining together adjacent first cavities to form connecting links of plastic between said plastic products to form a strip of said plastic products;
    cooling said molten plastic in said first and second cavities to a solid state;
    withdrawing said coring pins from said cooled plastic in said first cavities; and
    removing said strip of plastic elements from the circumferential perimeter of said wheel.

2. A method for making plastic products connected together by plastic links to form a strip of plastic products, comprising the steps of:
    forming a wheel having first cavities in the circumferential perimeter thereof with adjacent ones of said first cavities joined together by second cavities and with coring pins movable parallel to the axis of said wheel into and out of said first cavities;
    moving said coring pins into said first cavities;
    rotating the circumferential perimeter of said wheel past a molten plastic extrusion means to fill said first and second cavities with molten plastic to form plastic elements in said first cavities joined together by plastic links in said second cavities;
    cooling said molten plastic to a solid state;
    moving said coring pins out of said first cavities; and
    removing said strip of plastic elements from the circumferential perimeter of said wheel.

3. A method for making products comprising the steps of:
    continuously rotating past a molten plastic extrusion means the circumferential perimeter of a wheel having in said circumferential perimeter first cavities connected together by second cavities and containing rotatable, threaded coring pins extending radially into said first cavities;
    injecting molten plastic into said first cavities and around said rotatable threaded coring pins to form plastic products therein, and into said second cavities to form connecting links between said plastic products;
    cooling said molten plastic to a solid state;
    rotating said rotatable threaded coring pins to separate said rotatable threaded coring pins from said plastic products formed therearound; and
    removing said strip of plastic products from said first cavities on said wheel.

4. A method for making plastic products connected together by plastic links to form a strip of plastic products, comprising the steps of:
    forming a wheel having first cavities in the circumferential perimeter thereof with adjacent ones of said first cavities joined together by second cavities and with threaded coring pins extending radially into said first cavities;
    rotating the circumferential perimeter of said wheel past a molten plastic extrusion means to fill said first and second cavities with molten plastic to form plastic elements in said first cavities joined together by plastic links in said second cavities;

cooling said molten plastic to a solid state;

rotating said threaded coring pins to separate them from the plastic products formed in said first cavities; and removing said strip of plastic elements from the circumferential perimeter of said wheel.

* * * * *